(12) United States Patent
Semmler et al.

(10) Patent No.: US 7,658,553 B2
(45) Date of Patent: Feb. 9, 2010

(54) MECHANICAL SPLICE CONNECTOR WITH SEQUENTIAL SPLICE AND STRAIN RELIEF

(75) Inventors: Scott E. Semmler, Keller, TX (US); Brandon A. Barnes, Ft. Worth, TX (US); Kevin C. Beach, North Richland Hills, TX (US); Bradley S. Billman, Denton, TX (US); Donald G. Doss, Keller, TX (US); David W. Meek, Benbrook, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/374,682

(22) Filed: Mar. 14, 2006

(65) Prior Publication Data

US 2007/0217745 A1 Sep. 20, 2007

(51) Int. Cl.
*G02B 6/255* (2006.01)
*G02B 6/36* (2006.01)
*G02B 6/00* (2006.01)

(52) U.S. Cl. .............................. 385/98; 385/77; 385/86; 385/137

(58) Field of Classification Search ................. 385/135, 385/137, 140, 95–99
See application file for complete search history.

(56) References Cited

U.S. PATENT DOCUMENTS

| | | | |
|---|---|---|---|
| 4,030,809 A | 6/1977 | Onishi et al. | 350/96 C |
| 4,257,674 A | 3/1981 | Griffin et al. | 350/96.21 |
| 4,755,018 A | 7/1988 | Heng et al. | 350/96.21 |
| 4,877,303 A | 10/1989 | Caldwell et al. | 350/96.21 |
| 4,923,274 A | 5/1990 | Dean | 350/96.21 |
| 4,964,688 A | 10/1990 | Caldwell et al. | 350/96.2 |
| 5,040,867 A | 8/1991 | deJong et al. | 385/60 |
| 5,261,020 A | 11/1993 | deJong et al. | 385/76 |
| 5,394,496 A | 2/1995 | Caldwell et al. | 385/70 |
| 5,638,477 A * | 6/1997 | Patterson et al. | 385/99 |
| 6,173,097 B1 | 1/2001 | Throckmorton et al. | 385/59 |
| 6,379,054 B2 | 4/2002 | Throckmorton et al. | 385/66 |
| 6,439,780 B1 | 8/2002 | Mudd et al. | 385/83 |
| 6,442,318 B1 | 8/2002 | Goldman | 385/114 |

(Continued)

OTHER PUBLICATIONS

Siecor® CAMLITE™ Multimode Connector Procedure for Laser Usage, SRP-006-046, Circa 1991, 2 pages.

(Continued)

*Primary Examiner*—Uyen-Chau N Le
*Assistant Examiner*—Rhonda S Peace

(57) ABSTRACT

A mechanical splice connector is shown and described for sequentially performing a splice actuation followed by a strain relief actuation by rotating a single, multiple-position cam member or multiple cam members from an unactuated position to a first actuated position and a second actuated position. The mechanical splice connector aligns and retains at least one stub optical fiber and the bare glass portion of at least one adjoining field optical fiber, as well as strain relieving a coated portion of the field optical fiber, or alternatively, a buffered portion of the field optical fiber. A method is also described for sequentially performing a splice actuation followed by a strain relief actuation, wherein the splice actuation is reversible prior to performing the strain relief actuation in the event that the optical continuity of the splice coupling is unacceptable, thereby avoiding potential damage to the field optical fiber or the connector.

17 Claims, 4 Drawing Sheets

U.S. PATENT DOCUMENTS

| | | | |
|---|---|---|---|
| 6,816,661 B1 | 11/2004 | Barnes et al. | 385/134 |
| 6,931,193 B2 | 8/2005 | Barnes et al. | 385/134 |
| 7,204,644 B2 * | 4/2007 | Barnes et al. | 385/77 |
| 2002/0031323 A1 * | 3/2002 | Hattori et al. | 385/137 |
| 2005/0036744 A1 | 2/2005 | Caveney et al. | |
| 2005/0213890 A1 * | 9/2005 | Barnes et al. | 385/55 |
| 2005/0213897 A1 * | 9/2005 | Palmer et al. | 385/95 |
| 2005/0238292 A1 * | 10/2005 | Barnes et al. | 385/78 |
| 2005/0244108 A1 * | 11/2005 | Billman et al. | 385/60 |

OTHER PUBLICATIONS

Siecor® CAMLITE™ Connector Laser Assembly Aid Instructions, SRP-006-048, Issue 3, Sep. 1991, 6 pages.

Panduit Installation Instructions for SC Opticam Fiber Optic Connectors, six pages, 2005.

Panduit Specification Sheet for SC OPTICAM™ Pre-Polished Fiber Optic Connectors, two sheets, Aug. 2005.

NORDX/CDT Spec Sheet, FiberExpres Solutions—Optimax Field Installable Connector, two pages, no date.

* cited by examiner

MECHANICAL SPLICE CONNECTOR WITH SEQUENTIAL SPLICE AND STRAIN RELIEF

BACKGROUND OF THE INVENTION

1. Field of the Invention

The present invention relates generally to fiber optic mechanical splice connectors with sequential splice and strain relief, and more specifically, to a mechanical splice connector in which optical fiber splicing and optical fiber strain relief are performed sequentially utilizing a single, multiple-position actuator, or utilizing multiple actuators.

2. Technical Background

A key objective contributing to the proper function of a fiber optic mechanical splice connector is the alignment of the mating optical fibers within the connector. Alignment is typically accomplished by applying a biasing force to a splice component to accurately align the stub optical fiber of the connector with the mating field optical fiber. Conventional mechanical splice connectors typically include a pair of opposed splice components, wherein at least one of the splice components defines a recess, channel or groove for receiving and seating the bare glass portions of the optical fibers. The stub optical fiber and the field optical fiber are aligned and retained between the opposing splice components as the splice components are biased together by an actuator. The splice components are typically disposed within a connector housing, and generally within a ferrule holder secured to the rear of a connector ferrule mounted upon the stub optical fiber. A projection, such as a rib or keel, extends outwardly from one of the splice components through a passageway in the ferrule holder. The actuator, for example a cam member having an internal geometry defining a cam surface, is positioned over the splice components. In an unactuated (also referred to as "un-cammed" or "open") position, a larger internal diameter of the cam surface is located adjacent the projection with only minimal or no interference with the splice component. As the cam member is moved to the actuated (also referred to as "cammed" or "closed") position, a smaller internal diameter of the cam surface engages and exerts a radial compressive force on the projection, thus biasing the splice components together and thereby aligning and retaining the stub optical fiber and the field optical fiber between the splice components.

Once the optical fibers are aligned and retained in optical continuity between the splice components, the field optical fiber is typically strain relieved to the rear of the connector. Strain relief is generally accomplished by crimping a lead-in tube or an annular crimp ring about the buffered portion of the field optical fiber. As used herein, the terms "buffered" and "buffered optical fiber" each refer to both tight-buffered optical fiber and jacketed, or loose-tube, optical fiber cable having an outer diameter greater than about 250 microns. In contrast, the terms "un-buffered," "coated" and "coated optical fiber" each refer to the optical fiber as formed in a standard extrusion manufacturing process, including the core, the cladding and an extruded coating having an outer diameter up to and including about 250 microns. A 250 micron diameter un-buffered (hereinafter "coated") optical fiber is typically upsized to a 900 micron diameter buffered optical fiber or cable for mechanical strain relief and strength purposes. A drawback to the conventional strain relief technique for mechanical splice connectors is that once the field optical fiber is strain relieved, the splice cannot be reversed and reworked without destroying the connector assembly and potentially damaging the field optical fiber or the connector. United States Patent Application No. 2005/0036744 to Caveny et al. published on Feb. 17, 2005, discloses a stub fiber connector having a reversible actuator disposed about a ferrule holder for reversibly and nondestructively terminating (i.e., splicing) a stub optical fiber and a field optical fiber, while simultaneously providing reversible and nondestructive strain relief to the terminated field optical fiber. The actuator engages a projection (e.g., a rib or keel) protruding through the ferrule holder as described above to bias the splice components together. At the same time, a rearward portion of the actuator applies a biasing force to a buffer clamp to engage the buffered portion of the field optical fiber. As a result, the field optical fiber is simultaneously terminated and strain relieved to the connector. The actuator can be reversed to simultaneously release the buffer clamp from the buffered portion of the field optical fiber and the biasing force on the splice components, thereby permitting the field optical fiber to be removed from the connector or repositioned relative to the stub optical fiber.

Although seemingly advantageous, it is not always desirable to simultaneously terminate and strain relieve a field optical fiber to a mechanical splice connector. In particular, it is often preferable to determine the optical continuity of the splice coupling between the stub optical fiber and the field optical fiber prior to strain relieving the field optical fiber so as to avoid potentially damaging the field optical fiber or the connector in the event that the continuity of the optical splice is unacceptable and must be reworked. Further, if the optical splice is unacceptable, additional time and labor must be expended to first reverse the strain relief before removing or repositioning the field optical fiber and again terminating and strain relieving the field optical fiber to the connector. At the same time, it is often desirable for the field optical fiber to be at least partially strain relieved to the connector, and thereby restrained from torsion and localized bending during final assembly of the mechanical splice connector. For example, during final assembly the buffered portion of the field optical fiber may be additionally strain relieved to the connector housing, and a flexible boot or cable guide may be installed on the connector over the field optical fiber immediately adjacent the rear of the connector to prevent the field optical fiber from exceeding its minimum bend radius.

Accordingly, to overcome the disadvantages described above, while preserving certain of the advantages of known mechanical splice connectors, it is desirable in this instance to provide a mechanical splice connector in which optical fiber splicing and optical fiber strain relief are performed sequentially, and in which the field optical fiber is at least partially strain relieved to the connector during final assembly of the connector onto the field optical fiber. In addition to aligning and retaining the bare glass portions of the stub optical fiber and the field optical fiber, it would also be desirable for the mechanical splice connector to be configured to provide strain relief on a coated portion of the field optical fiber having a diameter up to and including about 250 microns, or in the alternative, on a buffered portion of the field optical fiber having a diameter greater than about 250 microns and up to about 900 microns or more. Furthermore, the mechanical splice connector may include a single, multiple-position actuator, wherein the actuator is moved from an unactuated position to a first actuated position to perform optical splicing (referred to herein as "splice actuation"), and then further moved from the first actuated position to a second actuated position to perform strain relief (referred to herein as "strain relief actuation"). Accordingly, the first actuated position is also referred to as the "splice actuation position" and the second actuated position is also referred to as the "strain relief actuation position." Alternatively, the mechanical splice connector may include multiple actuators, wherein a first actuator is moved from an unactuated position to a first actuated position for splice actuation, and a second actuator is subsequently moved from an unactuated position to a second actuated position for strain relief actuation. Such a mechanical splice connector would permit the optical continuity of the splice coupling to be determined prior to strain relieving the field optical fiber to the connector, thereby providing reversible splice actuation without potentially damaging the field optical fiber or the connector. At the same time, such a mechanical splice connector would insure that the field optical fiber is at least partially strain relieved to the connector, and thereby restrained from torsion and localized bending during final assembly of the mechanical splice connector.

SUMMARY OF THE INVENTION

In one aspect, the present invention is directed to a fiber optic mechanical splice connector configured to sequentially perform splice actuation, followed by strain relief actuation. The connector first aligns and retains the bare glass portions of at least one stub optical fiber and at least one adjoining field optical fiber in optical communication. The connector then strain relieves the coated portion of the field optical fiber having a diameter up to and including about 250 microns, or alternatively, strain relieves the buffered portion of the field optical fiber having a diameter greater than about 250 microns up to about 900 microns or more. In one preferred embodiment, the connector includes a single, multiple-position reversible actuator that is movable from an unactuated position to a first actuated position to splice the stub optical fiber and the field optical fiber together (splice actuation position), and is further movable from the first actuated position to a second actuated position to strain relieve the field optical fiber to the connector (strain relief actuation position). The actuator preferably comprises a cam member having an internal geometry that engages and exerts a radial compressive force to at least one of a pair of splice components, thereby biasing the splice components together with the bare glass portions of the stub optical fiber and the field optical fiber aligned and retained therebetween. The same cam member subsequently strain relieves the field optical fiber by applying a biasing force to one or more flexible, and in some embodiments sacrificial, strain relief elements capable of accommodating various diameters of the field optical fiber. The strain relief elements are shaped such that adequate strain relief is provided on a coated portion of a field optical fiber without over-crimping a buffered portion of a field optical fiber. In particular, the cam member is preferably flexible enough to accommodate field optical fibers of various diameters, while providing adequate strain relief on the coated portion of a field optical fiber having a diameter up to and including about 250 microns without over-crimping the buffered portion of a field optical fiber having a diameter greater than about 250 microns and up to about 900 microns or more. In other embodiments, an inner portion of the cam member is adapted to "break away" to accommodate larger diameter field optical fibers.

In another aspect, the present invention is directed to a mechanical splice connector including a single, multiple-position reversible actuator, such as a movable cam member. The cam member defines predetermined internal geometries adjacent each of its ends that function to apply a biasing force to different components of the connector as the cam member is moved. Preferably, the cam member is rotated from an unactuated position to a first actuated position for performing the splice actuation. As the cam member is rotated to the first actuated position, the cam surface defined by the internal geometry adjacent the first end of the cam member engages at least one of the splice components, thereby exerting a radial compressive biasing force on the splice component to align and retain the optical fibers therebetween. Once the first actuated position is reached, the optical continuity of the splice coupling may be determined using a Visual Fault Locator (VFL), for example the Continuity Test System (CTS) developed by Corning Cable Systems LLC of Hickory, North Carolina, or any other known means for determining whether the optical splice is acceptable. Once acceptable continuity is confirmed, the cam member is then rotated from the first actuated position to a second actuated position for performing the strain relief actuation. The coated portion, or alternatively the buffered portion, of the field optical fiber is strain relieved to the connector as the cam surface defined by the internal geometry adjacent the second end of the cam member applies a biasing force to one or more strain relief elements positioned on the connector rearward of the splice components. For example, a strain relief element may include crimp fingers of a strain relief body that flex, deform or collapse inwardly about the coated portion or alternatively the buffered portion of the field optical fiber. The crimp fingers are preferably flexible and/or collapsible to allow strain relief on the smaller diameter of a coated field optical fiber without over-crimping the larger diameter of a buffered field optical fiber. Following splice actuation and prior to strain relief actuation, the cam member is reversible without potentially damaging the field optical fiber or the connector. Following splice actuation and strain relief actuation, the cam member and the strain relief element(s) restrain the field optical fiber from torsion and localized bending during final assembly of the connector.

In yet another aspect, the present invention is directed to a mechanical splice connector including a first actuator for splice actuation, and a second actuator for strain relief actuation. For example, a mechanical splice connector is provided including separate cam members that are actuated sequentially to first perform splice actuation and then subsequently perform strain relief actuation. The first cam member is actuated, and preferably, is rotated from an unactuated position to a first actuated position for completing the optical splice between the stub optical fiber and the field optical fiber (splice actuation position). As the first cam member is rotated, the cam surface defined by the internal geometry of the cam member engages at least one splice component, thereby exerting a radial compressive biasing force on the splice component to align and retain the bare glass portions of the optical fibers therebetween. After the splice actuation position is reached, the optical continuity of the splice coupling may be determined using a VFL, such as the Corning Cable Systems CTS or any other known continuity test system. Once acceptable optical continuity has been determined, the second cam member is then rotated from its unactuated position to a second actuated position for strain relieving the field optical fiber to the connector (strain relief actuation position). The coated portion, or alternatively the buffered portion, of the field optical fiber is strain relieved as the cam surface defined by the internal geometry of the second cam member applies a biasing force to one or more strain relief elements positioned on the connector rearward of the splice components. For example, a strain relief element may include crimp fingers of a strain relief body that flex, deform or collapse inwardly about the coated portion or alternatively the buffered portion of the field optical fiber. The crimp fingers are preferably flexible and/or collapsible to allow strain relief on the smaller diameter of a coated field optical fiber without over-crimping the larger diameter of a buffered field optical fiber. Following splice actuation and prior to strain relief actuation, the first cam member is reversible without potentially damaging the field optical fiber or the connector. Following splice actuation and strain relief actuation, the second cam member and the strain relief element(s) restrain the field optical fiber from torsion and localized bending during final assembly of the connector. In another embodiment, the first cam member may be mechanically coupled to the second cam member, for example, by a linkage, gear arrangement, rack and pinion, etc., such that movement of the first cam member drives the subsequent movement of the second cam member.

In yet another aspect, the present invention is directed to a method for mounting a fiber optic mechanical splice connector onto the ends of one or more field optical fibers. The method includes the steps of preparing the one or more field optical fibers for splicing, inserting the one or more field optical fibers into an open rear end of the connector, receiving and seating the bare glass portion of the one or more field optical fibers within a corresponding groove defined by at least one splice component, and sequentially performing a splice actuation, followed by a strain relief actuation utilizing at least one actuator. For example, the splice actuation may be performed by rotating a single, multiple-position cam member from an unactuated position to a first actuated position to engage and exert a radial compressive biasing force on the splice component. The strain relief actuation may be performed by further rotating the single, multiple-position cam member from the first actuated position to a second actuated position to apply a biasing force to one or more strain relief elements positioned on the connector rearward of the splice components. In an alternative embodiment, the splice actuation may be performed by rotating a first cam member from an unactuated position to a first actuated position to engage and exert a radial compressive biasing force on the splice component. The strain relief actuation may be performed by rotating a second cam member from an unactuated position to a second actuated position to apply a biasing force to one or more strain relief elements positioned on the connector rearward of the splice components. Regardless, the cam member (or the first cam member) is reversible following splice actuation and prior to strain relief actuation without potentially damaging the field optical fiber or the connector. Following both splice actuation and strain relief actuation, the cam member (or the second cam member) and the strain relief element(s) restrain the field optical fiber from torsion and localized bending during final assembly of the connector. Accordingly, the optical continuity of the splice coupling may be determined after splice actuation and prior to strain relief actuation using a VFL, such as the Corning Cable Systems CTS or any known optical continuity test system.

In other aspects, the external features of the cam member(s) may be cylindrical or may have any other suitable shape (e.g., rectangular) in order to accommodate different types of connectors. Each of the cam members is preferably formed of a flexible material to provide sufficient biasing force to press the splice components together and to strain relieve the coated portion, or alternatively the buffered portion, of the field optical fiber in the first and second actuated positions. Alternatively, the cam member(s) may be formed of a substantially rigid material, thereby relying on interference forces to press the splice components together and to strain relieve the field optical fiber in the first and second actuated positions, respectively.

Additional features and advantages of the invention will be set forth in the detailed description which follows, and in part will be readily apparent to those skilled in the art from that description, or recognized by practicing the invention as described herein, including the detailed description, which follows, the appended claims, and the accompanying drawing figures.

It is to be understood that both the foregoing general description and the following detailed description present exemplary embodiments of the invention, and are intended to provide an overview or framework for understanding the nature and character of the invention as it is claimed. The accompanying drawing figures are included to provide a further understanding of the invention, and are incorporated into and constitute a part of this specification. The drawing figures illustrate various embodiments of the invention, and together with the detailed description, serve to explain the principles and operations thereof. Additionally, the drawing figures and descriptions are meant to be illustrative and not limiting.

DETAILED DESCRIPTION OF THE PREFERRED EMBODIMENTS

Figure 1:
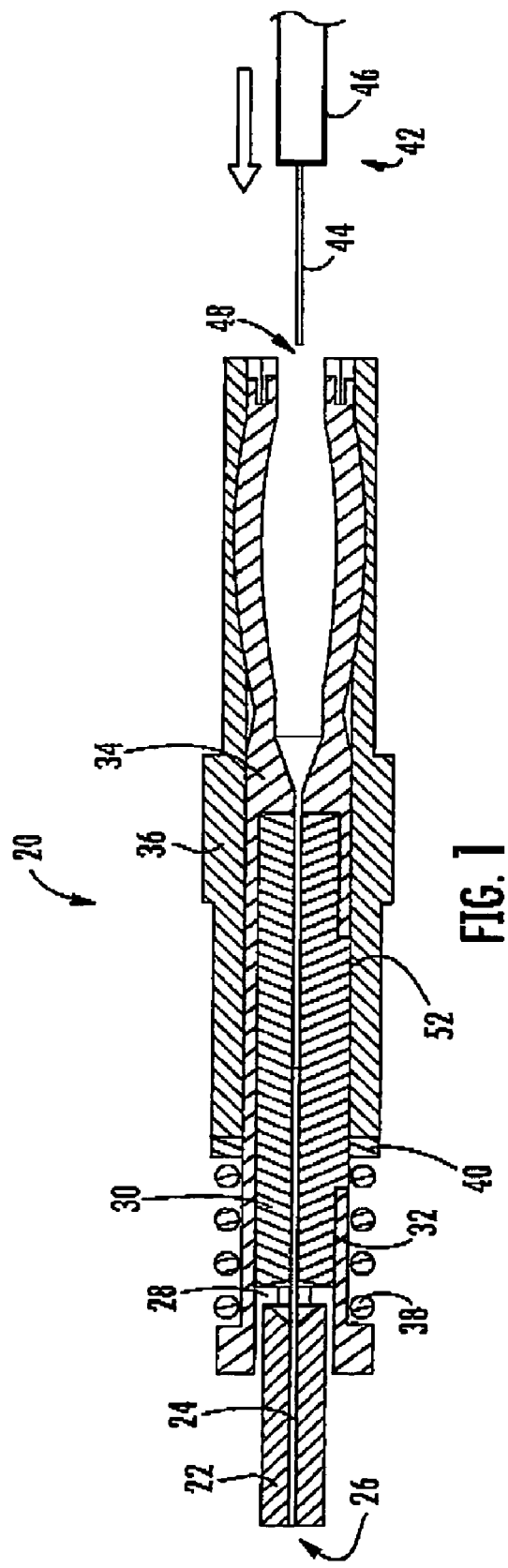
FIG. 1 is a lengthwise cross-sectional view of a fiber optic mechanical splice connector including a single, multiple-position cam member and one or more strain relief elements.

Reference will now be made in detail to the present preferred embodiments of the invention, examples of which are illustrated in the accompanying drawings. Whenever possible, the same reference numerals are used throughout the drawings to refer to the same or like parts. Although apparatus and methods for sequential splice actuation and strain relief actuation are described and shown in the accompanying drawings with regard to a specific type of fiber optic mechanical splice connector, it is envisioned that the functionality of the various apparatus and methods may be applied to any now known or hereafter devised fiber optic connector in which it is desired to optically align one or more mating optical fibers and to strain relieve at least one of the mating optical fibers.

Referring now to FIG. 1, a lengthwise cross-sectional view of an exemplary fiber optic mechanical splice connector 20 is shown. The connector 20 includes a connector ferrule 22 defining a lengthwise-extending, longitudinal bore for receiving and securing a stub optical fiber 24 in a known manner, such as by an adhesive or epoxy. The forward end (also referred to herein as the end face) 26 of the ferrule 22 is typically precision polished such that the stub optical fiber 24 is flush with (as shown) or slightly protruding from the end face of the ferrule 22. The end face 26 may be oriented generally perpendicular to the bore to provide an Ultra Physical Contact (UPC) type connector, or may be formed at a predetermined angle to provide an Angled Physical Contact (APC) type connector, in a known manner. In addition, although a single fiber ferrule 22 is shown for purposes of simplicity and clarity, the ferrule 22 may define a plurality of lengthwise bores therethrough for receiving a corresponding plurality of stub optical fibers to provide a multi-fiber mechanical splice connector.

The rear end of the ferrule 22 is inserted into and secured within the forward end of a ferrule holder 28 such that the stub optical fiber 24 extends rearwardly a predetermined distance from the ferrule 22 and is received between one or more splice components. In the exemplary connector shown, the splice components comprise a pair of opposed splice components 30, 32 that are disposed within a strain relief body 34. An actuator, and in particular a rotational cam member 36, substantially surrounds the strain relief body 34. In the embodiment shown, the ferrule 22 may be biased, for example by a coil spring 38, to ensure physical contact between the end face 26 of the ferrule 22 and the end face of an opposing ferrule in a mating fiber optic connector or optical device. Finally, a spring retainer 40 may be disposed about the strain relief body 34 so as to retain one end of the spring 38. As a result, the strain relief body 34, the splice components 30, 32, the ferrule holder 28 and the ferrule 22 are biased forwardly, yet permitted to piston rearwardly. In an alternative embodiment, a connector housing (not shown) may be disposed about the outer surface of the connector 20 and may replace all or a portion of the spring retainer 40 and the ferrule holder 28.

As shown, one end of the stub optical fiber 24 terminates at the precision polished end face 26 of the ferrule 22. The opposite end of the stub optical fiber 24 is prepared for optical connection with the bare glass portion 44 of a field optical fiber 42. The field optical fiber 42 further includes a coated (i.e., un-buffered) portion 46 having an outer diameter up to and including about 250 microns, or alternatively, a buffered portion 46 comprising a tight-buffered or loose tube cable jacket having an outer diameter greater than about 250 microns and up to about 900 microns or more. It should be noted that in some instances the coated portion 46 of the field optical fiber 42 may have an outer diameter up to and including about 500 microns. For purposes of clarity, however, the outer diameter of the coated portion 46 of the field optical fiber 42 shown and described herein is less than or equal to about 250 microns as obtained in a typical extrusion manufacturing process. Regardless, the outer diameter of the coated portion 46, or alternatively the buffered portion 46, of the field optical fiber 42 should not be construed as limiting the invention in any manner. Furthermore, the field optical fiber 42 may comprise a bare glass portion (generally about 125-127 microns), a coated portion (generally about 250 microns) and a buffered portion (generally about 900 microns). However, the strain relief actuation described herein will be performed on either the coated portion or the buffered portion of the field optical fiber, but not on both. Prior to insertion into the connector 20, the end of the field optical fiber 42 is stripped, cleaved to a specified length and cleaned, such that the bare glass portion 44 protrudes from the coated portion 46, or alternatively the buffered portion 46. The end of the field optical fiber 42 is inserted into the open end 48 of the connector 20 and guided between the splice components 30, 32 until the bare glass portion 44 is seated within the splice components 30, 32 and the coated portion 46, or alternatively the buffered portion 46, is positioned within a cavity 50 defined by the strain relief body 34. The field optical fiber 42 is advanced until the bare glass portion 44 comes into contact with free end of the stub optical fiber 24. Although not required, the mechanical splice connector 20 may be provided with a guiding means, for example a lead-in tube or chamfer (not shown), for guiding the field optical fiber 42 into the connector 20. As shown, the strain relief body 34 comprises a funnel-shaped guiding means adjacent the rear of the splice components 30, 32 for transitioning the bare glass portion 44 of the field optical fiber 42 from the strain relief body to the splice components.

The splice components 30, 32, also referred to herein as the "upper" splice component 30 and the "lower" splice component 32, are operable for receiving, aligning and restraining the stub optical fiber 24 and the bare glass portion 44 of the field optical fiber 42. The lower splice component 32 preferably defines a lengthwise projection 52, such as a rib or keel, formed along the underside, and a recess, channel or groove, such as a conventional v-groove, formed along the top side. As shown, the projection 52 preferably extends outwardly from the lower splice component 32 through a passageway provided in the strain relief body 34 adjacent a forward portion of the cam member 36. The internal geometry of the forward portion of the cam member 36 engages the projection 52 as the cam member is moved, and as shown and described herein, rotated from an unactuated position to a first actuated position, also referred to herein as the "splice actuation position." The upper splice component 30 defines a generally flat surface that opposes the v-groove formed on the top side of the lower splice component 32 to align and restrain the mating optical fibers as the splice components are pressed together during splice actuation. Of course, the locations of the v-groove and the flat surface can be reversed such that the v-groove is formed along the underside of the upper splice component 30 and the flat surface is formed on the top side of the lower splice component 32. Regardless, the v-groove and the flat surface together provide three points of contact on the stub optical fiber 24 and the field optical fiber 42, which is a generally accepted and preferred method to align small diameter optical fibers.

Figure 2:
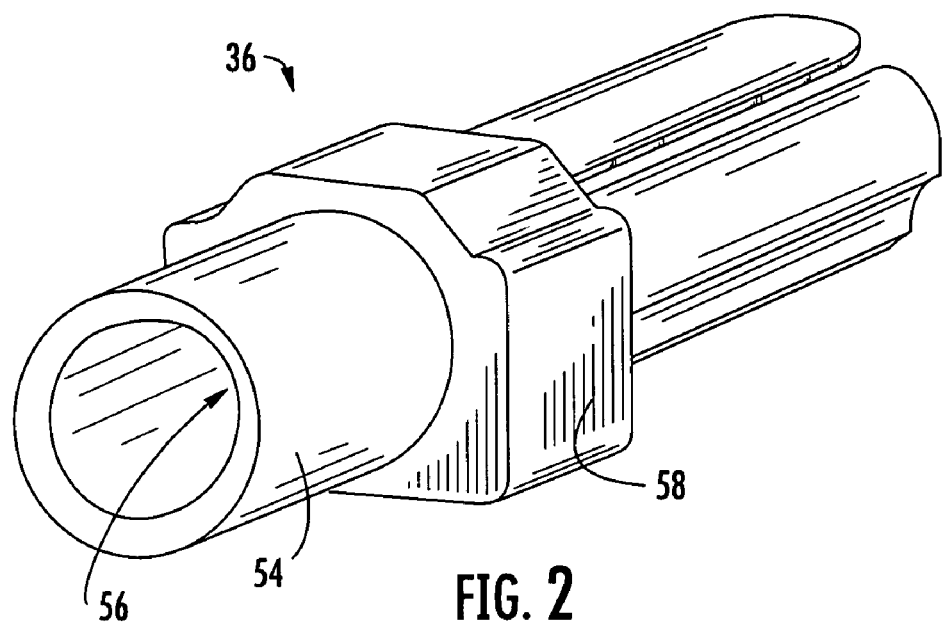
FIG. 2 is a perspective view of the multiple-position cam member of FIG. 1 illustrating a first end of the cam member defining a predetermined geometry for engaging and exerting a compressive biasing force on at least one splice component.
Figure 3:
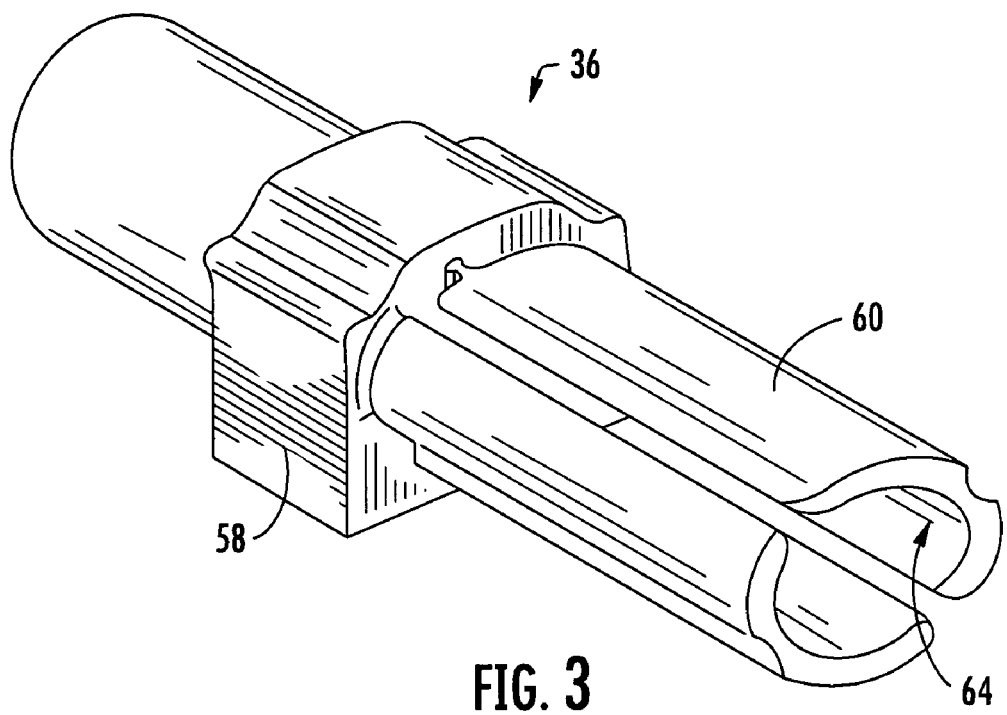
FIG. 3 is a perspective view of a second end of the cam member of FIG. 2 illustrating a predetermined geometry for applying a biasing force to the one or more strain relief elements.

Referring to FIGS. 2 and 3, perspective views of the ends of the cam member 36 are shown. The cam member 36 defines predetermined internal geometries at each of its ends that function to apply a radial compressive biasing force to different components of the connector 20 as the cam member 36 is actuated. Referring specifically to FIG. 2, a perspective view of the forward portion of the cam member 36 having a predetermined internal geometry operable for biasing the splice components 30, 32 together to perform the splice actuation is shown at 54. The splice actuation portion 54 is disposed about the strain relief body 34, which in turn is disposed about the splice components 30, 32. In particular, a cam surface defined by the internal diameter of the cam member 36 is situated opposite the projection 52 of the lower splice component 32 positioned within the passageway formed in the strain relief body 34. The splice actuation portion 54 has a generally cylindrical exterior surface and an internal cam surface that is generally cylindrical with a relief section 56. As will be described in greater detail hereinafter, the cam surface of the splice actuation portion 54 of the cam member 36 may be advanced from the corresponding cam surface of the strain relief actuation portion of the cam member, for example, by about 30 degrees. With the cam member 36 positioned in the unactuated position, the relief section 56 having a larger internal diameter is located opposite the projection 52, thus applying minimal or no interference to the lower splice component 32. As the cam member 36 is actuated (e.g., rotated) into the splice actuation position, the internal diameter of the cam member 36 gradually decreases and the cam surface defined by the splice actuation portion 54 of the cam member 36 engages and exerts a radial compressive force to the projection 52, thereby pressing the splice components 30, 32 together to align and restrain the stub optical fiber 24 and the bare glass portion 44 of the field optical fiber 42 between the splice components. The cam member 36 further defines a medial portion 58 having a predetermined exterior shape so that the cam member 36 may be rotated by hand or by using a tool, such as a cam wrench, as is commonly known in the art. A suitable tool preferably includes features for holding the remainder of the connector 20 stationary while a lever, wrench or gear is used to rotate the cam member 36.

Referring specifically to FIG. 3, a perspective view of the rearward portion of the cam member 36 having a predetermined internal geometry operable for strain relieving the coated portion 46, or alternatively the buffered portion 46, of the field optical fiber 42 to the connector is shown at 60. The strain relief actuation portion 60 is disposed about the rearward portion of the strain relief body 34 opposite one or more strain relief fingers 62 (FIGS. 4-7) provided on the strain relief body. As shown and described herein, the strain relief actuation portion 60 has a generally cylindrical exterior surface and comprises one or more peripheral sections configured to expand or contract such that the internal diameter of the strain relief actuation portion of the cam member 36 may accommodate outer diameters of the field optical fiber 42 ranging from about 250 microns to about 900 microns. As previously described, the coated portion 46 of the field optical fiber 42 typically has an outer diameter up to and including about 250 microns and the buffered portion 46 of the field optical fiber typically has an outer diameter greater than about 250 microns and up to about 900 microns or more. The sections of the strain relief actuation portion 60 are capable of expanding and/or deforming to define an internal cam surface for accommodating the range of diameters of the coated and buffered portions of the field optical fiber 42 typically utilized in both indoor and outdoor installations. In an additional embodiment, at least one section of the strain relief actuation portion 60 of the cam member 36 may be configured to "break away" to accommodate larger diameter optical fibers and cables. The strain relief actuation portion 60 likewise defines an internal cam surface that is generally cylindrical with a relief section 64 having a larger internal diameter. The internal cam surface may also have a generally oval shape with the relief section 64. With the cam member 36 positioned in the splice actuation position, the relief section 64 having a larger internal diameter is located opposite the crimp fingers 62 of the strain relief body 34, thereby applying minimal or no interference to the crimp fingers 62. As the cam member 36 is actuated (e.g., rotated) into the second actuated position, also referred to herein as the "strain relief actuation position," the internal diameter of the cam member gradually decreases and the cam surface defined by the strain relief actuation portion 60 of the cam member engages and applies a radial compressive biasing force to the crimp fingers 62, thereby pressing the crimp fingers 62 against the coated portion 46, or alternatively the buffered portion 46, of the field optical fiber 42.

Thus, the cam member 36 shown and described above may be referred to as a "two-step," "stepped," "dual-stage" or "staged" cam member operable for sequentially performing splice actuation on at least one of the splice components 30, 32, followed by strain relief actuation on the strain relief body 34. The cam member 36 is capable of both alignment and retention of the stub optical fiber 24 and the bare glass portion 44 of the field optical fiber 42, as well as strain relief of the coated portion 46, or alternatively the buffered portion 46, of the field optical fiber 42, wherein the coated portion has an outer diameter up to and including about 250 microns and the buffered portion has an outer diameter greater than about 250 microns and up to about 900 microns or more. In a preferred embodiment, the cam member 36 is rotated from an unactuated position to a first actuated position for performing the splice actuation of the stub optical fiber 24 and the field optical fiber 42, followed by rotation to a second actuated position for performing the strain relief actuation of the field optical fiber. The cam member 36 performs the splice actuation during rotation to the first actuated position by applying a radial compressive biasing force to the splice components 30, 32, thereby pressing the splice components about the stub optical fiber 24 and the bare glass portion 44 of the mating field optical fiber 42. The cam member 36 performs the strain relief actuation during rotation to the second actuated position by applying a biasing force to one or more flexible, and in some embodiments sacrificial, strain relief elements, such as crimping fingers 62, shown in FIGS. 4-7.

Figure 4:
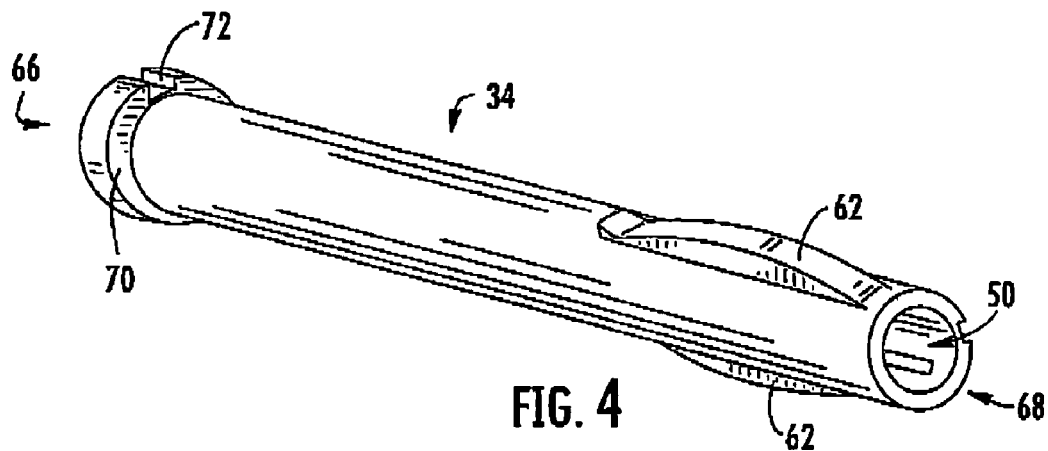
FIG. 4 is a perspective view of an exemplary strain relief element defining a strain relief body comprising crimping fingers.
Figure 5:
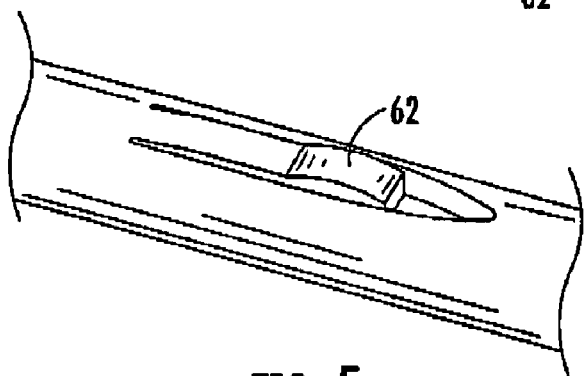
FIG. 5 is a perspective view of an alternative embodiment of the strain relief element of FIG. 4.
Figure 6:
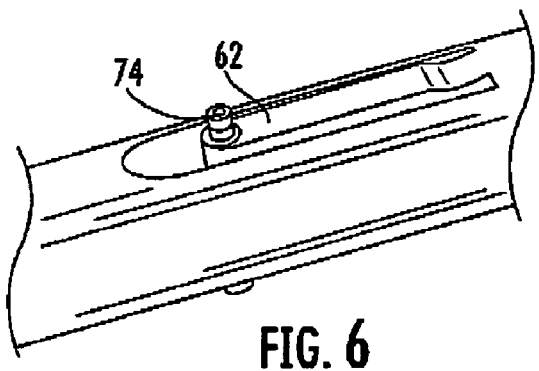
FIG. 6 is a perspective view of another alternative embodiment of the strain relief element of FIG. 4.
Figure 7:
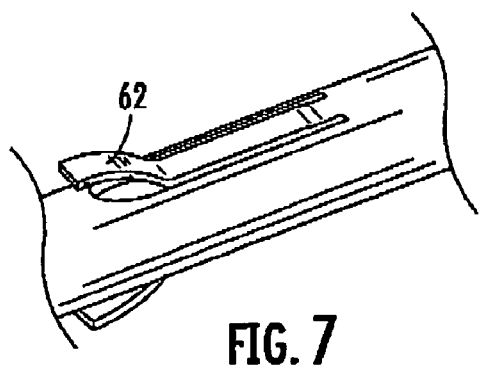
FIG. 7 is a perspective view of yet another alternative embodiment of the strain relief element of FIG. 4.

Referring now specifically to FIGS. 4-7, various embodiments of strain relief elements having crimping features are shown. FIG. 4 is a detail view of the strain relief body 34 shown in FIG. 1. The strain relief body 34 has a generally cylindrical shape and defines a forward end 66 for receiving the ferrule holder 28 and the ferrule 22, including the stub optical fiber 22, and a rearward end 68 for receiving the field optical fiber 42. Although not shown, the rearward end 68 may further define a lead-in or chamfer for guiding the field optical fiber 42 into the cavity 50 of the strain relief body 34. Proximate the forward end 66, the strain relief body 34 defines a shoulder 70 for seating a biasing means, such as coil spring 38. A notch 72 may also be provided at the forward end 66 that engages a corresponding protrusion on the ferrule holder 28 (or a connector housing) to prevent the strain relief body 34 from rotating within the connector 20 relative to the ferrule holder, ferrule 22 and splice components 30, 32. Proximate the rearward end 68, the strain relief body 34 defines at least one, and preferably a pair of opposed strain relief elements, referred to herein as crimp fingers 62, that are configured to provide adequate strain relief on the smaller diameter coated portion 46 of the field optical fiber 42 having an outer diameter up to and including about 250 microns, without over-crimping the larger diameter buffered portion 46 of the field optical fiber 42 having an outer diameter greater than about 250 microns and up to about 900 microns or more. Accordingly, the cam member 36 is preferably flexible enough to accommodate coated and buffered optical fibers and cables having an outer diameter up to about 900 microns or more. The crimp fingers 62 may be flexible and/or sacrificial, and are capable of collapsing or deforming as necessary to accommodate the range of outer diameters of the coated or buffered field optical fiber 42. FIGS. 4-7, illustrate various configurations of crimp fingers 62 that engage the cam surface defined by the internal geometry of the strain relief portion 60 of the cam member 36 during strain relief actuation. As the cam member 36 is rotated to the strain relief actuation position, the cam surface of the strain relief portion 60 of the cam member 36 rides over the crimp fingers 62 and causes the crimp fingers to bend or flex radially inward against the coated portion 46, or alternatively the buffered portion 46, of the field optical fiber 42, thereby strain relieving the field optical fiber to the connector 20. In the various embodiments shown and others, the crimp fingers 62 flex to prevent over-crimping on the larger diameters of the buffered potion 46 of the field optical fiber 42. Referring specifically to FIG. 6, the cylinder-shaped feature 74 on top of each crimp finger 62 is capable of radial deformation in order to prevent over-crimping on a buffered portion 46 of the field optical fiber 42 having an outer diameter greater than, for example, about 700 microns.

Figure 8:
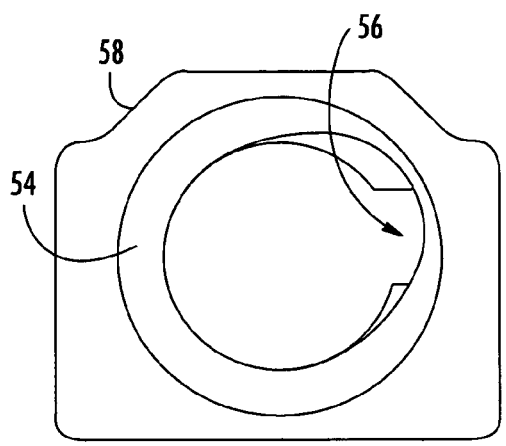
FIG. 8 is an end view of the first end of the cam member of FIG. 2 illustrating the internal geometry of the cam member for splice actuation.
Figure 9:
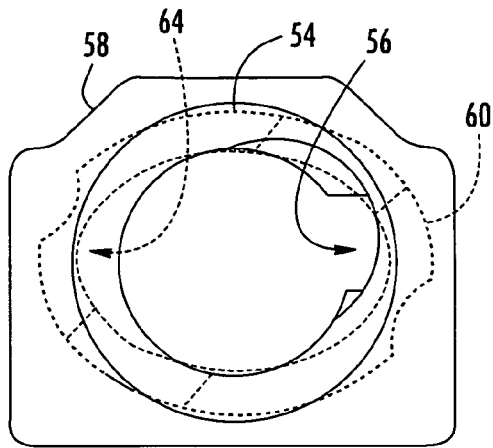
FIG. 9 is an end view of the second end of the cam member of FIG. 2 illustrating the internal geometry of the cam member for strain relief actuation.

Referring now to FIG. 8, an end view of the splice actuation portion 54 of the cam member 36 is shown to further illustrate the internal geometry of the cam member 36, including the relief section 56. Referring now to FIG. 9, an end view of the splice actuation portion 54 of the cam member 36 is shown again, but in this instance includes the strain relief portion 60 of the cam member 36 represented in broken lines. In the exemplary embodiment shown, the internal geometry (i.e., the cam surface and the relief section 64) of the strain relief actuation portion 60 of the cam member 36 may be delayed by a predetermined amount from the internal geometry (i.e., the cam surface and the relief section 56) of the splice actuation portion 54 of the cam member 36. For example, the cam surface defined by the strain relief actuation portion 60 and the relief section 64 may be delayed by about 30 degrees, thus providing a single, multiple-position cam member 36. Preferably, the cam member 36 is rotated from an unactuated position to a first actuated position for performing the splice actuation of the stub optical fiber and the field optical fiber, followed by rotation to a second actuated position for performing the strain relief actuation of the coated or buffered portion of the field optical fiber.

Figure 10:
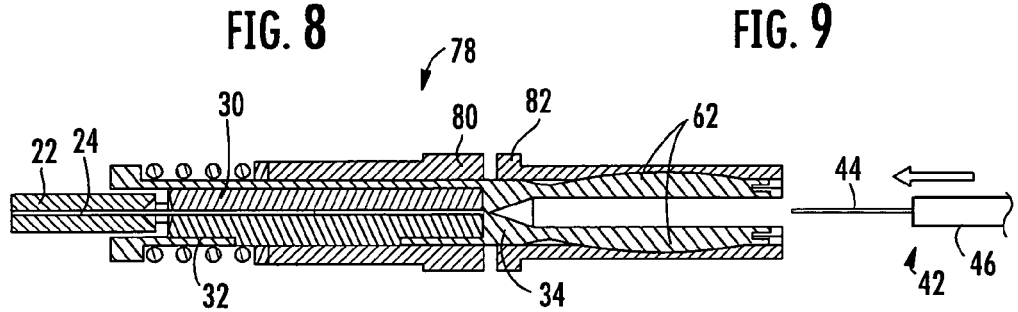
FIG. 10 is a lengthwise cross-sectional view of an alternative embodiment of a fiber optic mechanical splice connector including a first cam member for splice actuation and a second cam member for strain relief actuation.
Figure 11:
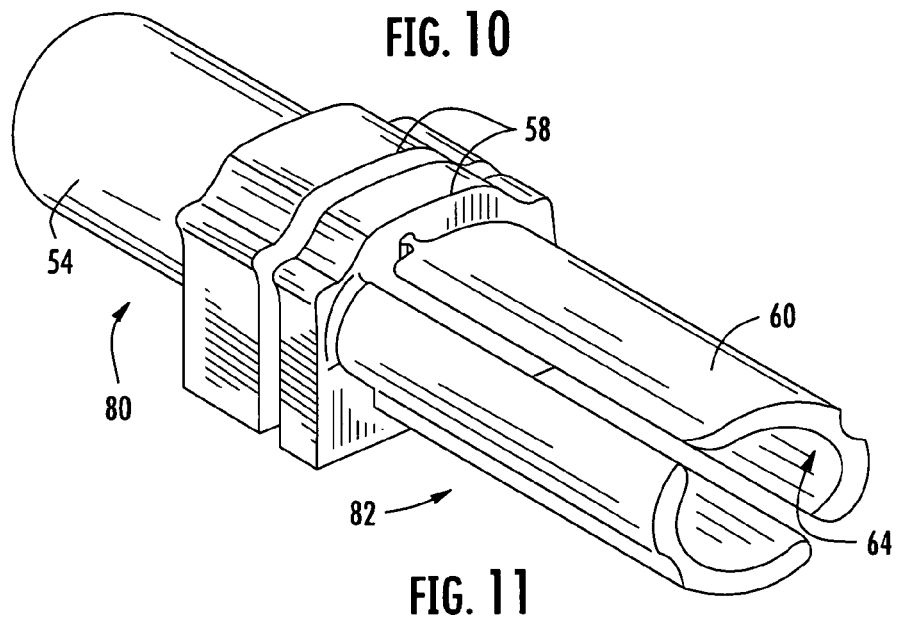
FIG. 11 is a perspective view of the first cam member and the second cam member of FIG. 10.

Referring now to FIG. 10, an alternative embodiment of a fiber optic mechanical splice connector 78 is shown that comprises a first cam member 80 for performing the splice actuation, as previously described, and a second cam member 82 for performing the strain relief actuation, as previously described. The connector 78 comprises two rotatable and reversible cam members 80, 82 that are actuated sequentially. The first cam member 80 is actuated first and is preferably rotated from an unactuated position to a first actuated position for performing the splice actuation. With the first cam member 80 rotated to the first actuated position, the cam surface defined by the internal geometry of the first cam member engages and exerts a radial compressive biasing force to the splice components 30, 32, thereby aligning and retaining the stub optical fiber 24 and the bare glass portion 44 of the field optical fiber 42, as previously described. The second cam member 82 is next rotated from its unactuated position to a second actuated position for performing the strain relief actuation. The coated portion 46, or alternatively the buffered portion 46, of the field optical fiber 42 is strain relieved as the cam surface defined by the internal geometry of the second cam member 82 applies a biasing force to the one or more strain relief elements, such as crimping fingers 62, provided on the strain relief body 34, as previously described. As with the alternative embodiment of the connector 20 shown in FIG. 1, the strain relief actuation portion 60 of the cam member 82 is capable of flexing to prevent over-crimping of the larger diameter buffered portion 46 of the field optical fiber 42. The crimping fingers 62 are also preferably flexible and/or collapsible to strain relieve the smaller diameter coated portion 46 of the field optical fiber 42 without over-crimping the larger diameter of the buffered portion 46 of the field optical fiber. Referring now to FIG. 10, perspective views of the first cam member 80 and second cam member 82 are shown. In a preferred embodiment, the cam members 80, 82 are individually rotated by a respective medial portion 58 in the proper sequence using, for example, a tool comprising two separate cam levers or a single, slideable cam lever. In yet another embodiment, the first cam member 80 may be mechanically coupled to the second cam member 82, for example, by a linkage, gear arrangement, rack and pinion, etc. (not shown), such that movement of the first cam member drives the subsequent movement of the second cam member.

In all embodiments of a fiber optic mechanical splice connector in accordance with the invention, the initial actuation motion performs the optical splice. The subsequent actuation motion, preferably a continuation of the initial motion or a motion similar to the initial motion, performs the strain relief actuation. In the event that the splice actuation process is completed prior to performing the strain relief actuation, the splice actuation may be reversed without potentially damaging the field optical fiber or the connector, thereby returning the connector to the unactuated position. An installer may take advantage of this feature in the event that the optical continuity (i.e. transmission) of the splice coupling is found to be unacceptable when a continuity test is performed. For example, the installer may utilize a conventional Visual Fault Locator (VFL) to conduct an optical continuity test, such as the Continuity Test System (CTS) available from Corning Cable Systems of Hickory, N.C., and observe that an unacceptable insertion loss is present after the splice actuation is performed, but before the strain relief actuation is performed. The installer could then reverse the splice actuation process, for example by returning the cam member described above to the unactuated position, remove the field optical fiber and repeat the preparation and insertion steps, or merely reposition the field optical fiber between the splice components. The testing and removing/repositioning process could then be repeated as many times as necessary to obtain an acceptable splice coupling without potentially damaging the field optical fiber or the connector by repeating the strain relief actuation. At the same time, the additional amount of time and labor required to repeatedly perform the strain relief actuation. Once the optical continuity of the splice coupling is determined to be acceptable, the installer would then perform the strain relief actuation. Once the strain relief actuation has been performed, the strain relief elements, and possibly the cam surfaces defined by the internal geometry of the cam member described above, will be deformed in order to strain relieve the coated portion or the buffered portion of the field optical fiber, and thus, the strain relief actuation may not be reversible without damaging the field optical fiber or the connector.

With regard to the optical continuity of the splice coupling, it should be noted that a slight amount of attenuation and/or reflectance is inevitable at any optical coupling due to the fact that the cores of the optical fibers are not truly concentric and the mechanical joint between the optical fibers cannot be formed with the same precision as a continuous optical fiber. Accordingly, the continuity of the optical coupling between the stub optical fiber and the field optical fiber is acceptable when a variable related to the optical performance of the connector, such as insertion loss or reflectance, is within a prescribed limit or meets a predetermined threshold value.

A method according to the invention is also provided for mounting a fiber optic mechanical splice connector upon the ends of one or more optical fibers, such as a field optical fiber.

The method includes the steps of preparing the ends of one or more field optical fibers for splicing, inserting the one or more field optical fibers into an open rear end of the connector, receiving the stub optical fiber and the bare glass portion of the corresponding field optical fiber within a channel, recess or groove formed in at least one splice component, and sequentially performing a splice actuation, followed by a strain relief actuation. The splice actuation may be performed by actuating, and preferably by rotating, a multiple-position cam member from an unactuated position to a first actuated position to engage and exert a radial compressive biasing force to at least one splice component. The strain relief actuation may then be performed by actuating, and preferably by rotating, the multiple-position cam member from the first actuated position to a second actuated position to apply a biasing force to one or more strain relief elements, such as crimping fingers, provided on a strain relief body. In an alternative embodiment, the splice actuation may be performed by actuating, and preferably by rotating, a first cam member from an unactuated position to a first actuated position to engage and exert a radial compressive biasing force to at least one splice component. In the alternative embodiment, the strain relief actuation may then be performed by actuating, and preferably by rotating, a second cam member from an unactuated position to a second actuated position to apply a biasing force to one or more strain relief elements, such as crimping fingers, provided of a strain relief body. In either of the alternative embodiments, the splice actuation is reversible prior to performing the strain relief actuation without potentially damaging the field optical fiber or the connector. Accordingly, the optical continuity of the splice coupling between the stub optical fiber and the field optical fiber may be determined after splice actuation, but prior to strain relief actuation.

The apparatus and method of the present invention may be used with other types of fiber optical mechanical splice connectors. Advantageous types of fiber optic connector that are designed specifically to facilitate field installation are the UNICAM® family of field-installable fiber optic connectors available from Corning Cable Systems LLC of Hickory, N.C. Although the UNICAM® family of field-installable connectors includes a number of common features, the connectors may be adapted to include the splice actuation and strain relief actuation techniques described with respect to the present invention. With all types of fiber optic mechanical splice connectors, the continuity of the optical coupling between the stub optical fiber and the field optical fiber is preferably determined prior to the strain relief actuation. Again, a splice coupling would be deemed acceptable when a variable related to the optical performance of the connector, such as insertion loss or reflectance, is within a prescribed limit or threshold value.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A mechanical splice connector for sequentially performing a splice actuation followed by a strain relief actuation, the connector comprising:
   a single, multiple-position cam member movable from an unactuated position to a first actuated position for performing and completing the splice actuation and subsequently movable from the first actuated position to a second actuated position for performing the strain relief actuation;
   a ferrule having at least one stub optical fiber extending rearwardly a predetermined distance from the ferrule;
   a strain relief body having a lengthwise extending passageway for receiving and guiding at least one field optical fiber; and
   at least one splice component positioned between the ferrule and at least a portion of the strain relief body, the at least one splice component configured to receive and align the at least one stub optical fiber and the at least one field optical fiber;
   wherein the cam member is disposed about at least a portion of the at least one splice component and about at least a portion of the strain relief body and the cam member comprises a splice actuation portion adjacent a forward end and a strain relief actuation portion adjacent a rearward end.

2. The splice connector according to claim 1 wherein the splice actuation portion has an internal geometry defining a cam surface that engages and exerts a biasing force to the at least one splice component.

3. The splice connector according to claim 2 wherein the internal geometry of the splice actuation portion defines a relief section having a larger diameter such that the cam member does not exert the biasing force to the at least one splice component in the unactuated position.

4. The splice connector according to claim 1 wherein the strain relief actuation portion has an internal geometry defining a cam surface that engages and applies a biasing force to at least one strain relief element provided on the strain relief body.

5. The splice connector according to claim 4 wherein the internal geometry of the strain relief actuation portion defines a relief section having a larger diameter such that the cam member does not apply the biasing force to the at least one strain relief element in the first actuated position.

6. The splice connector according to claim 4 wherein the strain relief actuation portion and the at least one strain relief element are configured to strain relieve a coated portion of the at least one field optical fiber having an outer diameter up to and including about 250 microns, or alternatively, to strain relieve a buffered portion of the at least one field optical fiber having an outer diameter greater than about 250 microns and up to and including about 900 microns.

7. The splice connector according to claim 4 wherein the strain relief actuation portion comprises one or more adjacent sections that are flexible or deformable to accommodate a field optical fiber having an outer diameter greater than about 700 microns.

8. The splice connector according to claim 4 wherein the at least one strain relief element comprises one or more flexible or deformable crimping fingers for strain relieving the at least one field optical fiber to the strain relief body.

9. A mechanical splice connector for sequentially performing a splice actuation followed by a strain relief actuation, the connector comprising:
   at least one actuator movable from an unactuated position to a first actuated position for performing the splice actuation and subsequently movable to a second actuated position for performing the strain relief actuation, wherein the at least one actuator comprises a first cam member and a second cam member, the first cam member movable from an unactuated position to the first actuated position to perform the splice actuation and the second cam member movable from an unactuated position to the second actuated position to perform the strain relief actuation, wherein the first cam member comprises a splice actuation portion adjacent a forward end and the second cam member comprises a strain relief actuation portion adjacent a rearward end;

a ferrule having at least one stub optical fiber extending rearwardly a predetermined distance from the ferrule;

a strain relief body having a lengthwise extending passageway for receiving and guiding at least one field optical fiber; and at least one splice component positioned between the ferrule and at least a portion of the strain relief body, the at least one splice component configured to receive and align the at least one stub optical fiber and the at least one field optical fiber, wherein the first cam member is disposed about at least a portion of the at least one splice component and the second cam member is disposed about at least a portion of the strain relief body, wherein the strain relief actuation portion has an internal geometry defining a cam surface that engages and applies a biasing force to at least one strain relief element provided on the strain relief body, and wherein the internal geometry of the strain relief actuation portion defines a relief section having a larger diameter such that the second cam member does not apply the biasing force to the at least one strain relief element in the first actuated position.

10. The splice connector according to claim 9 wherein the splice actuation portion has an internal geometry defining a cam surface that engages and exerts a biasing force to the at least one splice component, and wherein the internal geometry of the splice actuation portion defines a relief section having a larger diameter such that the first cam member does not exert the biasing force to the at least one splice component in the unactuated position.

11. The splice connector according to claim 9 wherein the strain relief actuation portion and the at least one strain relief element are configured to strain relieve a coated portion of the at least one field optical fiber having an outer diameter up to and including about 250 microns, or alternatively, to strain relieve a buffered portion of the at least one field optical fiber having an outer diameter greater than about 250 microns and up to and including about 900 microns.

12. The splice connector according to claim 9 wherein the strain relief actuation portion comprises one or more adjacent sections that are flexible or deformable to accommodate a field optical fiber having an outer diameter greater than about 700 microns, and wherein the at least one strain relief element comprises one or more flexible or deformable crimping fingers for strain relieving the at least one field optical fiber to the strain relief body.

13. A method for mounting a mechanical splice connector having a ferrule with at least one stub optical fiber disposed upon the end of at least one adjoining field optical fiber, comprising:

preparing the at feast one field optical fiber for splicing;

inserting the at least one field optical fiber into an open rear end of the connector;

receiving and aligning the at least one stub optical fiber and a bare glass portion of the at least one field optical fiber within at least one splice component;

performing and completing a splice actuation by moving a single, multiple-position cam member from an unactuated position to a first actuated position to engage and exert a biasing force to the at least one splice component; and subsequently performing a strain relief actuation by moving the single, Multiple-position cam member of the mechanical splice connector from the first actuated position to a second actuated position to apply a biasing force to at least one strain relief element.

14. The method according to claim 13, further comprising determining whether the optical continuity of a splice coupling between the at least one stub optical fiber and the at least one adjoining field optical fiber is acceptable after performing and completing the splice actuation and prior to performing the strain relief actuation.

15. The method according to claim 14 wherein performing and completing the splice actuation can be reversed prior to performing the strain relief actuation in the event that the optical continuity of the splice coupling is unacceptable.

16. The method according to claim 14, wherein the optical continuity of the splice coupling is determined utilizing a Visual Fault Locator (VFL).

17. A mechanical splice connector for sequentially performing a splice actuation followed by a strain relief actuation, the connector comprising:

at least one actuator movable from an unactuated position to a first actuated position for performing the splice actuation and subsequently movable to a second actuated position for performing the strain relief actuation, wherein the at least one actuator comprises a single, multiple-position cam member, the cam member movable from an unactuated position to the first actuated position to perform the splice actuation and subsequently movable from the first actuated position to the second actuated position to perform the strain relief actuation;

a ferrule having at least one stub optical fiber extending rearwardly a predetermined distance from the ferrule;

a strain relief body having a lengthwise extending passageway for receiving and guiding at least one field optical fiber; and at least one splice component positioned between the ferrule and at least a potion of the strain relief body, the at least one splice component configured to receive and align the at least one stub optical fiber and the at least one field optical fiber, wherein the cam member is disposed about at least a portion of the at least one splice component and about at least a portion of the strain relief body, the cam member comprising a splice actuation potion adjacent a forward end and a strain relief actuation portion adjacent a rearward end, wherein the strain relief actuation portion includes an internal geometry defining a cam surface that engages and applies a biasing force to at least one strain relief element provided on the strain relief body, and wherein the internal geometry of the strain relief actuation portion defines a relief section having a larger diameter such that the cam member does not apply the biasing force to the at least one strain relief element in the first actuated position.

* * * * *